US009410610B1

(12) United States Patent
Pritchard et al.

(10) Patent No.: US 9,410,610 B1
(45) Date of Patent: Aug. 9, 2016

(54) ECO MODE E-ASSIST

(71) Applicant: BorgWarner Inc., Auburn Hills, MI (US)

(72) Inventors: Larry A. Pritchard, Macomb, MI (US); Thaddeus Kopp, Oakland Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/824,724

(22) Filed: Aug. 12, 2015

(51) Int. Cl.
*F16H 57/04* (2010.01)

(52) U.S. Cl.
CPC .......... *F16H 57/0483* (2013.01); *F16H 57/045* (2013.01); *F16H 57/0476* (2013.01); *F16H 57/0482* (2013.01); *F16H 57/0434* (2013.01); *F16H 57/0435* (2013.01)

(58) Field of Classification Search
None
See application file for complete search history.

(56) References Cited

U.S. PATENT DOCUMENTS

| | | | | |
|---|---|---|---|---|
| 5,259,194 A | * | 11/1993 | Okada | B60K 17/14 475/83 |
| 2006/0223670 A1 | * | 10/2006 | Nishikawa | B60K 6/387 477/168 |
| 2007/0074949 A1 | * | 4/2007 | Yoshioka | F16D 43/284 192/85.02 |
| 2011/0192245 A1 | * | 8/2011 | Shioiri | F16H 57/0423 74/467 |
| 2012/0091835 A1 | * | 4/2012 | Kim | B60K 6/26 310/54 |
| 2012/0091836 A1 | * | 4/2012 | Hayashi | F16H 57/0412 310/54 |
| 2012/0286607 A1 | * | 11/2012 | Shimizu | F16H 57/0483 310/90 |
| 2013/0305878 A1 | * | 11/2013 | Seno | F16H 57/0423 74/665 A |
| 2014/0262675 A1 | * | 9/2014 | Sugiyama | F16H 57/0445 192/85.01 |

OTHER PUBLICATIONS

U.S. Appl. No. 14/824,675, filed Aug. 12, 2015; Title: E-Assist With Torque Vectoring ; First named inventor: Larry A. Pritchard.
U.S. Appl. No. 14/811,880, filed Jul. 29, 2015 ;Title: Two Motor e-Assist AWD ; First named inventor: Larry A. Pritchard.
U.S. Appl. No. 14/824,595, filed Aug. 12, 2015: Title: Elecrtic Drive System ; First named inventor: Larry A. Pritchard.

* cited by examiner

*Primary Examiner* — Justin Holmes
(74) *Attorney, Agent, or Firm* — BrooksGroup

(57) ABSTRACT

A product may include a differential unit, and an electrical machine may be interconnected with the differential unit. The differential unit and the electrical machine may be lubricated by a fluid. A reservoir may be defined above the electrical machine. The reservoir may receive the fluid during operation of the differential unit and may selectively store and release the fluid.

20 Claims, 2 Drawing Sheets

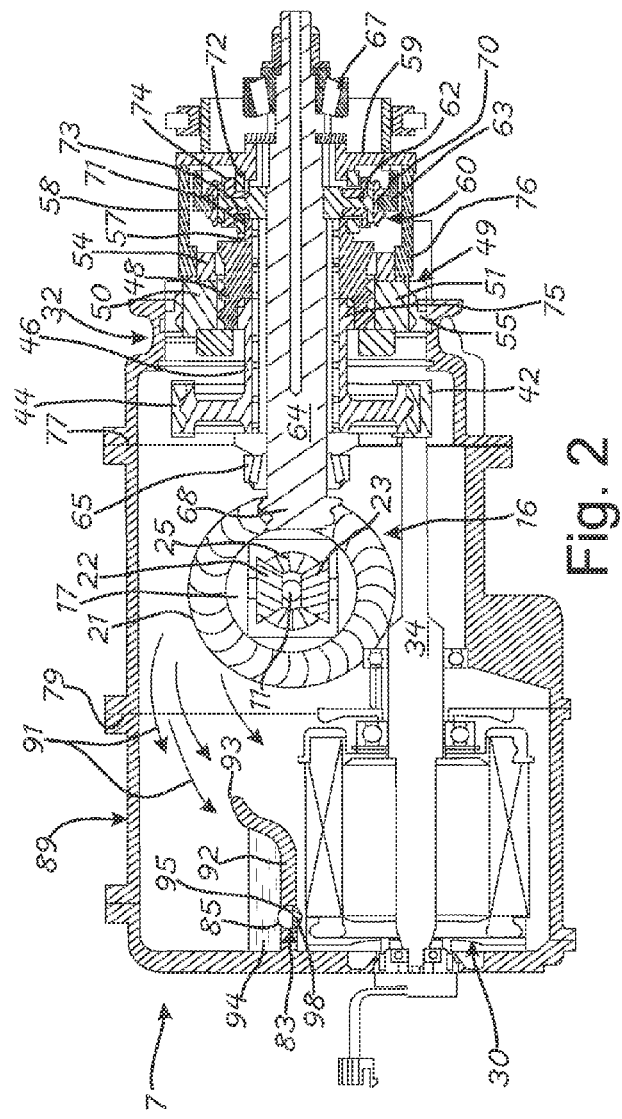

ECO MODE E-ASSIST

TECHNICAL FIELD

The field to which the disclosure generally relates includes vehicle drive systems and more particularly, includes vehicle drive systems with electric motive input.

BACKGROUND

Vehicle drive systems may include a combustion engine, electric motor or other power plant for propulsion. Hybrid vehicles may include a combination of different types of power plants.

SUMMARY OF ILLUSTRATIVE VARIATIONS

According to a number of illustrative variations, a product may include a differential unit, and an electrical machine may be interconnected with the differential unit. The differential unit and the electrical machine may be lubricated by a fluid. A reservoir may be defined above the electrical machine. The reservoir may receive the fluid during operation of the differential unit and may selectively store and release the fluid.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 2 is a fragmentary cross sectional schematic illustration of a product showing part of a vehicle powertrain according to a number of variations.

FIG. 3 is a schematic illustration of part of a product showing a valve according to a number of variations.

FIG. 4 is a schematic illustration of part of a product showing a valve according to a number of variations.

DETAILED DESCRIPTION OF ILLUSTRATIVE VARIATIONS

Figure 1:
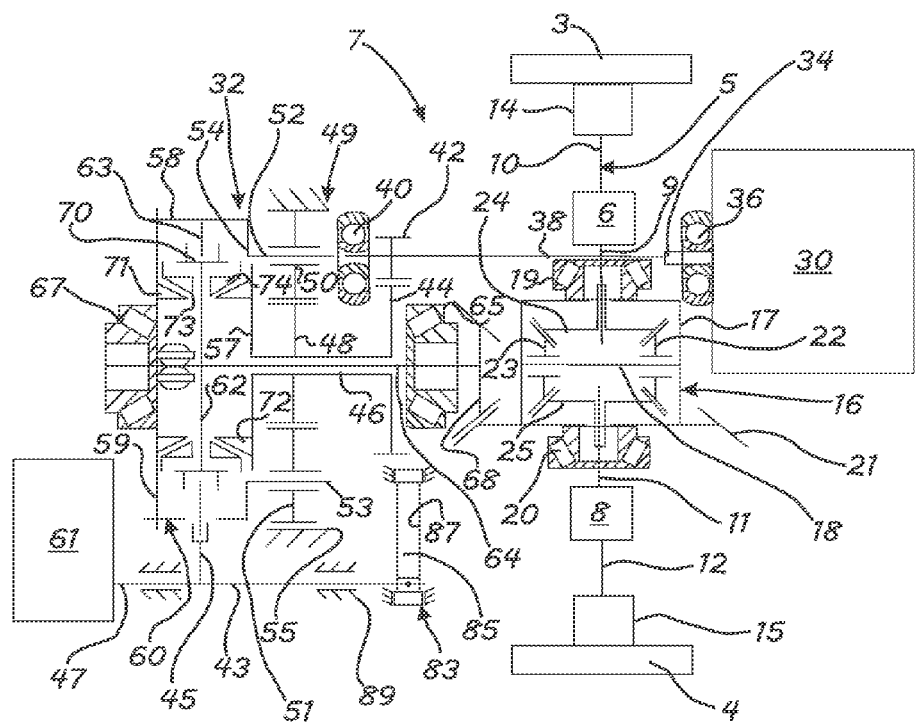
FIG. 1 is a schematic illustration of a product showing part of a vehicle powertrain according to a number of variations.

The following description of the variations is merely illustrative in nature and is in no way intended to limit the scope of the invention, its application, or uses.

In a number of variations as illustrated in FIG. 1, a product 7 may include road wheels 3 and 4 which may be connected to an axle assembly 5. The axle assembly 5 may include inner joints 6 and 8, which may be constant velocity joints that may transfer rotation and may allow for angular variation between the connected components. The joint 6 may connect an axle shaft 9 with an axle shaft 10. The Joint 8 may connect an axle shaft 11 with an axle shaft 12. The axle shafts 10 and 12 may be connected with outer joints 14 and 15 respectively, which may be constant velocity joints and may be connected to the road wheels 3 and 4, respectively.

In a number of variations the axle assembly 5 may have a differential unit 16. The differential unit 16 may include a cage 17 and may have a pinion shaft 18 that may be engaged at each of its ends with the cage 17. The cage 17 may be rotatable and may be carried by bearings 19 and 20. A gear 21 may be engaged or fixed with the cage 17 to rotate therewith. The gear 21 may be a ring gear and may be a bevel gear and may be a spiral bevel right angle gear. The pinion shaft 18 may carry a pinion gear 22 and a pinion gear 23, each of which may be rotatable on the pinion shaft 18. A side gear 24 may mesh with each of the pinion gears 22, 23 and another side gear 25 may mesh with each of the pinion gears 22, 23. Rotation of the cage 17 may cause the pinion gears 22, 23 to rotate, which may cause the side gears 24, 25 to rotate.

In a number of variations the axle shaft 9 may have an end that may be engaged with the side gear 24 to rotate therewith and may have its opposite end engaged with the inner joint 6. The axle shaft 11 may have an end that may be engaged with the side gear 25 to rotate therewith and may have its opposite end engaged with the inner joint 8. Rotation of the gear 21 may cause the cage 17 to rotate and through the pinion gears 22, 23 and the side gears 24, 25, may cause the axle shafts 9 and 11 to rotate driving the road wheels 3, 4.

In a number of variations an electrical machine 30 may be connected with the axle assembly 5 through a power transfer unit 32. The electrical machine 30 may be a motor or may be a motor-generator, or may be another type of electrical machine to provide power to the power transfer unit 32. A shaft 34, which may be a rotor shaft may extend from the electrical machine 30 and may be supported by bearings 36. The shaft 34 may be engaged with the proximal end of a shaft 38, or may itself, extend past the axle assembly 5 without connecting directly therewith, and a distal end may be supported for rotation by bearings 40. A gear 42, which may be a helical gear may be fixed on the shaft 34 or 38 to rotate therewith and may be disposed in the power transfer unit 32.

In a number of variations the gear 42 may mesh with, and may be positively engaged to rotate with, a gear 44. The gear 44 may be a helical gear and may have a larger diameter than the gear 42 to provide a reduction there between from the shaft 34 or 38. The gear 44 may be connected with a torque transfer element 46 that may be tubular in shape and may connect with, and may be positively engaged to rotate with a gear 48. The gear 48 may be a sun gear in a gear set 49, which may be a planetary gear set. The gear 48 may mesh with, and may be positively engaged to rotate with gears 50 and 51. The gears 50, 51 may be planet gears and another number may be provided. The gears 50, 51 may rotate on pins 52 and 53, respectively, which may be fixed to a carrier 54. The gears 50, 51 may mesh with and may be positively engaged to rotate relative to a gear 55 which may be a ring or annulus gear and may include internal teeth. The gear 55 may be held or grounded so that it may be fixed from rotation. Rotation of the gear 48 may cause the gears 50, 51 to rotate and to walk around the inside of the gear 55 which may cause the carrier 54 to rotate. The torque transfer element 46 may be connected to or formed with a torque transfer element 57, or the gear 48 may be connected to or formed with the torque transfer element 57. As a result, the gear 44, the torque transfer element 46, the gear 48 and the torque transfer element 57 may rotate together. The carrier 54 may be connected to or formed with a torque transfer element 58 and may rotate therewith, and the torque transfer element 58 may be engaged with, or fixed to, a torque transfer element 59.

In a number of variations a mechanical mechanism 60 may include an engagement element 62 that may be fixed to rotate with a shaft 64. The shaft 64 may be supported for rotation by bearings 65, 67 and may extend through the torque transfer element 46. A gear 68 may be fixed with the shaft 64 to rotate therewith and may mesh with and may be positively engaged to rotate with the gear 21 to drive or be driven by the axle assembly 5. The gear 68 may be a bevel gear and may be a spiral bevel right angle gear. The engagement element 62 may selectively disconnect the driven gear set 49 from the shaft 64 as shown in FIG. 1. The engagement element 62 may be selectively shifted to the right in the perspective of FIG. 1 by a shift member 63, which may be a shift fork, to selectively connect the gear set 49 with the shaft 64 with output from the gear 48 and its connected torque transfer element 57. The engagement element 62 may be selectively shifted to the left in the perspective of FIG. 1 by the shift member 63 to connect the gear set 49 with the shaft 64 with output from the carrier 54 and its connected torque transfer elements 58, 59. When input may be provided from the gear 48 to the shaft 64, rotational speed from the torque transfer element 46 may be maintained for high range. When input may be provided from the carrier 54 to the shaft 64, rotational speed from the torque transfer element 46 may be reduced and torque may be increased for low range.

In a number of variations the shift member 63 may be moved by an actuator 61 of a type known in the art, which may be a mechanical, electrical, fluid, or another type of actuator, or a combination thereof. The actuator 61 may move a linking element 47, which may be connected with the shift member 63, which may be accomplished through an arm 45. In a number of variations the mechanical mechanism 60 may include the engagement element 62, which may be the hub of a dual cone type synchronizing clutch or synchronizer. An annular groove 70 may be provided around the outer circumference of the engagement element 62 within which the shift member 63 may be received. Range selection may be performed by the actuator 61 that may move the shift member 63 to move the engagement element 62 axially on the shaft 64. The mechanical mechanism 60 may include reaction rings 72 and 71 that may be fixed to the respective torque transfer element 57 and the torque transfer element 59. A blocker ring 73 may be positioned between the reaction ring 71 and the engagement element 62, and a blocker ring 74 may be positioned between the reaction ring 72 and the engagement element 62. Friction material may be carried between corresponding mating surfaces of the blocker rings and reaction rings. The shift member 63 may be moved to transfer torque from the engagement element 62 to the torque transfer element 58 by engaging the blocker ring 73 with the reaction ring 71. The shift member 63 may center the engagement element 62 for neutral. The shift member 63 may be moved to transfer torque from the engagement element 62 to the torque transfer element 57 by engaging the blocker ring 74 with the reaction ring 72.

In a number of variations a second arm 43 may be provided on the linking element 47, which may extend to a valve 83. The valve 83 may be a rotary valve that may include a spool 85 that may be rotatable. The spool 85 may be positioned in a bore 87 of a housing assembly 89 of the product 7. Extension or retraction of the linking element 47 by the actuator 61 may cause the shift member 63 to move and may cause the spool 85 to rotate bi-directionally to selectively open or close a passage through the housing assembly 89. The linking element 47 may operate the valve 83 to rotate by connecting it with the gear train of the power transfer unit 32 which may operate in a number of modes that may include high range, low range and neutral. The gear train may include the gears 42, 44, the gear set 49, and the mechanical mechanism 60, to transfer torque from the electric machine 30 to the differential unit 16.

With reference to FIG. 2, elements that are like elements in FIG. 1 are indicated with the same reference numerals. In a number of variations the product 7 may include the electrical machine 30 that may provide rotational torque to the axle shafts 9 and 11 (only axle shaft 11 visible in FIG. 2), or may receive rotational torque from the axle shafts 9 and 11. The electrical machine 30 may include, or may be connected with a shaft 34 that may extend through the housing assembly 89 to the gear 42 which may be engaged with the gear 44. The gear 44 may be connected with the torque transfer element 46, which may include an end 75 that may be positioned within the gear 48 and that may be rotationally fixed therewith such as through a splined connection. The gear 48 may be connected or formed with the torque transfer element 57 that may extend to a location adjacent the mechanical mechanism 60. On a side of the mechanical mechanism 60 opposite the torque transfer element 57, the torque transfer element 59 may be connected with, and may be rotationally fixed with, the carrier 54, which may occur through an intermediate torque transfer element 58. The torque transfer element 59 may be connected to the torque transfer element 59 and may include an end 76 that may extend over, and may be engaged with, the carrier 54. The carrier 54 may carry the gears 50 and 51. The gears 50 and 51 may be rotationally engaged between the gear 55 and the gear 48. The engagement element 62 may be connected, such as through an axially moveable splined connection, to the shaft 64 so that the engagement element 62 and the shaft 64 may rotate together. The shaft 64 may be connected with the gear 68, which may be engaged with the gear 21 to rotate therewith. The gear 21 may be fixed to the cage 17, the rotation of which may transfer rotation to the pinion gears. 22, 23. Rotation of the pinion gears 22, 23 may transfer rotational torque to the side gears 24, 25 (only side gear 25 visible in FIG. 2), which may be fixed to the axle shafts 9, 11, respectively.

In a number of variations the gear 21, the cage 17, the pinion gears 22, 23 and the side gears 24, 25 may be assembled in the differential unit 16. The gears 42, 44, the gear set 49 and the mechanical mechanism 60 may be assembled in the power transfer unit 32, which may be positioned on one side 77 of the differential unit 16. The reduction gear arrangement of the gear set 42, 44 within the power transfer unit 32 may be easily lubricated by oil in the power transfer unit 32 with the meshing interface provided at one location. The electrical machine 30 may be positioned on a side 79 of the differential unit 16 opposite the side 77. The motor shaft 34 and the shaft 64 may be parallel and each may extend into the differential unit 16.

In a number of variations the electrical machine 30, the power transfer unit 32 and the differential unit 16 may be contained in a number of connected housing sections collectively referenced as the housing assembly 89. The rotating elements including the gear 21 may directly splash oil 91 for lubricating and cooling the electrical machine 30 and other rotating elements with oil from inside the differential unit 16. The housing assembly 89 may include an internally extending platform 92 that may include a raised rim 93. The platform 92 and rim 93 may define a reservoir 94 within the housing assembly 89 that may trap splash oil 91 when the product 7 is in operation. The spool 85 may be positioned in the platform 92 and may seal the bottom of the reservoir 94 when in the closed position as shown in FIG. 1. The spool 85 may be cylindrical and may have a flat surface 95 formed along a portion of its length. The flat surface 95 may be parallel to the platform 92 when the valve 83 is closed.

In a number of variations rotational engagement of the reaction ring 72 with the blocker ring 74 by moving the shift member 63, shifting the engagement element 62 toward the reaction ring 72, may transfer torque between the carrier 54 and the engagement element 62 (through the torque transfer elements 58, 59). This may provide a mode where the shaft 64 may be driven by the carrier 54. Providing output from the gear set 49 at the carrier 54, with the gear 55 fixed, may provide a low range mode at a first gear ratio. Moving the shift member 63 for the low range mode may be accomplished by retraction of the linking element 47 by the actuator 61. This may rotate the spool 85 in a clockwise direction as viewed in FIG. 3, which may open a passage 96 through the platform 92 at the spool 85 allowing oil to drain from the reservoir 94, through the opening 96 and toward the electrical machine 30. When the electrical machine 30 is in operation in the low range, the passage 96 may provide additional oil for cooling and lubrication from the reservoir 94.

Rotational engagement of the blocker ring 73 with the reaction ring 71 by moving the shift member 63 shifting the engagement element 62 toward the reaction ring 71, may transfer torque between the gear 48 (through the torque transfer element 57), and the engagement element 62. This may provide a mode where the shaft 64 may be driven by the gear 48 which may be a sun gear. Providing output from the gear set 49 at the gear 48 may provide a high range mode at a second gear ratio that is higher than the first gear ratio, transferring a higher speed transfer. The high range mode ratio may be 1:1. Moving the shift member 63 for the high range mode may be accomplished by extension of the linking element 47 by the actuator 61. This may rotate the spool 85 in a counter-clockwise direction as viewed in FIG. 4, which may open a passage 97 through the platform 92 and the spool 85 allowing oil to drain from the reservoir 94, through the open passage 97 and toward the electrical machine 30. When the electrical machine 30 is in operation in the high range the passage 96 may provide additional oil for cooling and lubrication from the reservoir 94.

As shown in FIG. 2, the shift member 63 may center the engagement element 62 between the reaction rings 71, 72 so that no torque may be transferred through the mechanical mechanism 60 from the electrical machine 30, which may provide a neutral mode of operation. When in the neutral mode the electric machine may be off. This may correspond with closure of the valve 83 with the land 98 registering with the platform 92 providing no opening there through. During operation of the associated vehicle, the gears in the differential unit 16 may spin when the road wheels 3, 4 rotate. This may continue to direct oil 91 to the reservoir 94 where it is trapped, reducing the oil level in the remainder of the product 7. A reduced oil level may translate to reduced churning losses, with reduced shearing loss and reduced viscous drag torque. This may result in improved operational efficiency when e-Assist is not needed.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve a product that may include a differential unit, and an electrical machine may be interconnected with the differential unit. The differential unit and the electrical machine may be lubricated by a fluid. A reservoir may be defined above the electrical machine. The reservoir may receive the fluid during operation of the differential unit and may selectively store and release the fluid.

Variation 2 may include the product according to variation 1 wherein a valve may be positioned adjacent the reservoir and may be placed in an open condition to selectively release the fluid from the reservoir.

Variation 3 may include the product according to variation 2 wherein the valve may be placed in a closed condition to selectively store the fluid from the reservoir.

Variation 4 may include the product according to any of variations 1 through 3 wherein a power transfer unit may be connected between the electrical machine and the differential unit. The power transfer unit may include a gear train shiftable between a high range mode, a low range mode and a neutral mode.

Variation 5 may include the product according to variation 4 and may include a valve adjacent the reservoir that may be placed in an open condition to selectively release the fluid from the reservoir when the gear train is shifted to either the high range mode or the low range mode. The valve may be placed in a closed condition to selectively store the fluid from the reservoir when the gear train is shifted to the neutral mode.

Variation 6 may include the product according to variation 5 and may include an actuator that may have a linking element operated by the actuator and that may be connected with the gear train.

Variation 7 may include the product according to variation 6 wherein the valve is a rotary valve and the linking element includes an arm that connects the rotary valve with the gear train.

Variation 8 may include the product according to any of variations 5 through 7 wherein the rotary valve is rotatable between the open and the closed positions.

Variation 9 may involve a product that may include an axle assembly, and may include a road wheel driven by the axle assembly. A gear may drive the axle assembly and may be lubricated by a fluid. An electrical machine may be connected with the axle assembly and may have a rotor. A housing assembly may cover at least a part of the axle assembly or the electrical machine. A reservoir may be defined by the housing above the rotor and may hold the fluid. A valve may be openable to release the fluid from the reservoir and may be closable to store the fluid in the reservoir.

Variation 10 may include the product according to variation 9 wherein the axle assembly may include a differential unit and the gear may be disposed in the differential unit.

Variation 11 may involve a product according to variation 10 wherein the fluid may be directed into the reservoir by the gear.

Variation 12 may include the product according to variation 10 or 11 and may include a power transfer unit that may be connected between the electrical machine and the differential unit. The power transfer unit may include a mechanical mechanism that may be shiftable between a high range mode, a low range mode and a neutral mode. The valve may be opened to selectively release the fluid from the reservoir when the mechanical mechanism is shifted to either the high range mode or the low range mode. The valve may be closed to selectively store the fluid in the reservoir when the mechanical mechanism is shifted to the neutral mode.

Variation 13 may include the product according to variation 12 and may include an actuator that may have a linking element operated by the actuator and connected with the mechanical mechanism.

Variation 14 may include the product according to variation 13 wherein the linking element may include an arm that may be connected with the valve and operating the valve in conjunction with shifting the mechanical mechanism.

Variation 15 may involve a product and may include a pair of axle shafts. A power transfer unit may provide power to the pair of axle shafts. A differential unit may provide a connection between the pair of axles and the power transfer unit. An electrical machine may be connected to the power transfer unit. A platform may define a reservoir adjacent the electrical machine. A fluid may lubricate the differential unit and the differential unit may direct a part of the fluid into the reservoir.

What is claimed is:

1. A product comprising a differential unit, an electrical machine interconnected with the differential unit, the differential unit and the electrical machine lubricated by a fluid, and a reservoir defined above the electrical machine, the reservoir receiving the fluid during operation of the differential unit and selectively storing and releasing the fluid.

2. The product according to claim 1 further comprising a valve adjacent the reservoir that is placed in an open condition to selectively release the fluid from the reservoir.

3. The product according to claim 2 wherein the valve is placed in a closed condition to selectively store the fluid in the reservoir.

4. The product according to claim 1 further comprising a power transfer unit connected between the electrical machine and the differential unit, and the power transfer unit includes a gear train shiftable between a high range mode, a low range mode and a neutral mode.

5. The product according to claim 4 further comprising a valve adjacent the reservoir that is placed in an open condition to selectively release the fluid from the reservoir when the gear train is shifted to either the high range mode or the low range mode and wherein the valve is placed in a closed condition to selectively store the fluid in the reservoir when the gear train is shifted to the neutral mode.

6. The product according to claim 5 further comprising an actuator with a linking element operated by the actuator and connected with the gear train.

7. The product according to claim 6 wherein the valve is a rotary valve and the linking element includes an arm that connects the rotary valve with the gear train.

8. The product according to claim 7 wherein the rotary valve is rotatable between the open and the closed positions.

9. A product comprising an axle assembly, a road wheel driven by the axle assembly, a gear driving the axle assembly and lubricated by a fluid, an electrical machine that is connected with the axle assembly and that has a rotor, a housing assembly covering at least a part of the axle assembly or the electrical machine, a reservoir defined by the housing above the rotor and holding the fluid, and a valve that is openable to release the fluid from the reservoir and closable to store the fluid in the reservoir.

10. The product according to claim 9 wherein the axle assembly includes a differential unit and the gear is disposed in the differential unit.

11. The product according to claim 10 wherein the fluid is directed into the reservoir by the gear.

12. The product according to claim 10 further comprising a power transfer unit connected between the electrical machine and the differential unit, and the power transfer unit includes a mechanical mechanism shiftable between a high range mode, a low range mode, and a neutral mode, wherein the valve is opened to selectively release the fluid from the reservoir when the mechanical mechanism is shifted to either the high range mode or the low range mode and wherein the valve is closed to selectively store the fluid in the reservoir when the mechanical mechanism is shifted to the neutral mode.

13. The product according to claim 12 further comprising an actuator with a linking element operated by the actuator and connected with the mechanical mechanism.

14. The product according to claim 13 wherein the linking element includes an arm connected with the valve and operating the valve in conjunction with shifting the mechanical mechanism.

15. A product comprising a pair of axle shafts, a power transfer unit providing power to the pair of axle shafts, a differential unit providing a connection between the pair of axle shafts and the power transfer unit, and an electrical machine connected to the power transfer unit with a platform defining a reservoir adjacent the electrical machine wherein a fluid lubricates the differential unit and the differential unit directs a part of the fluid into the reservoir.

16. The product according to claim 15 further comprising a valve adjacent the reservoir, and that is placed in an open condition to selectively release the fluid from the reservoir and that is placed in a closed condition to selectively store the fluid in the reservoir, and an actuator with a linking element operated by the actuator and connected with the power transfer unit and with the valve.

17. The product according to claim 16 wherein the linking element is connected to a shift member that places the power transfer unit in a number of different operating modes.

18. The product according to claim 15 wherein the platform defines a bore and further comprising a valve spool disposed in the bore and selectively opening and closing the bore.

19. The product according to claim 15 wherein the differential unit includes differential gears and wherein the electrical machine includes a rotor shaft that extends below the differential gears from a first side of the differential unit to a second side of the differential unit, and connects with the power transfer unit.

20. The product according to claim 15 further comprising a valve controlling flow from the reservoir and through the platform wherein the valve is placed in an open condition to selectively release the fluid from the reservoir when the power transfer unit is shifted to either the high range mode or the low range mode and wherein the valve is placed in a closed condition to selectively store the fluid in the reservoir when the power transfer unit is shifted to the neutral mode, and comprising an actuator that is connected with both the power transfer unit and with the valve to simultaneously shift the power transfer unit and reposition the valve.

* * * * *